May 28, 1940.　　　　G. MÖLLER　　　　2,202,222
CENTERING MEANS FOR DRILLING MACHINE SPINDLES
Original Filed Jan. 4, 1937
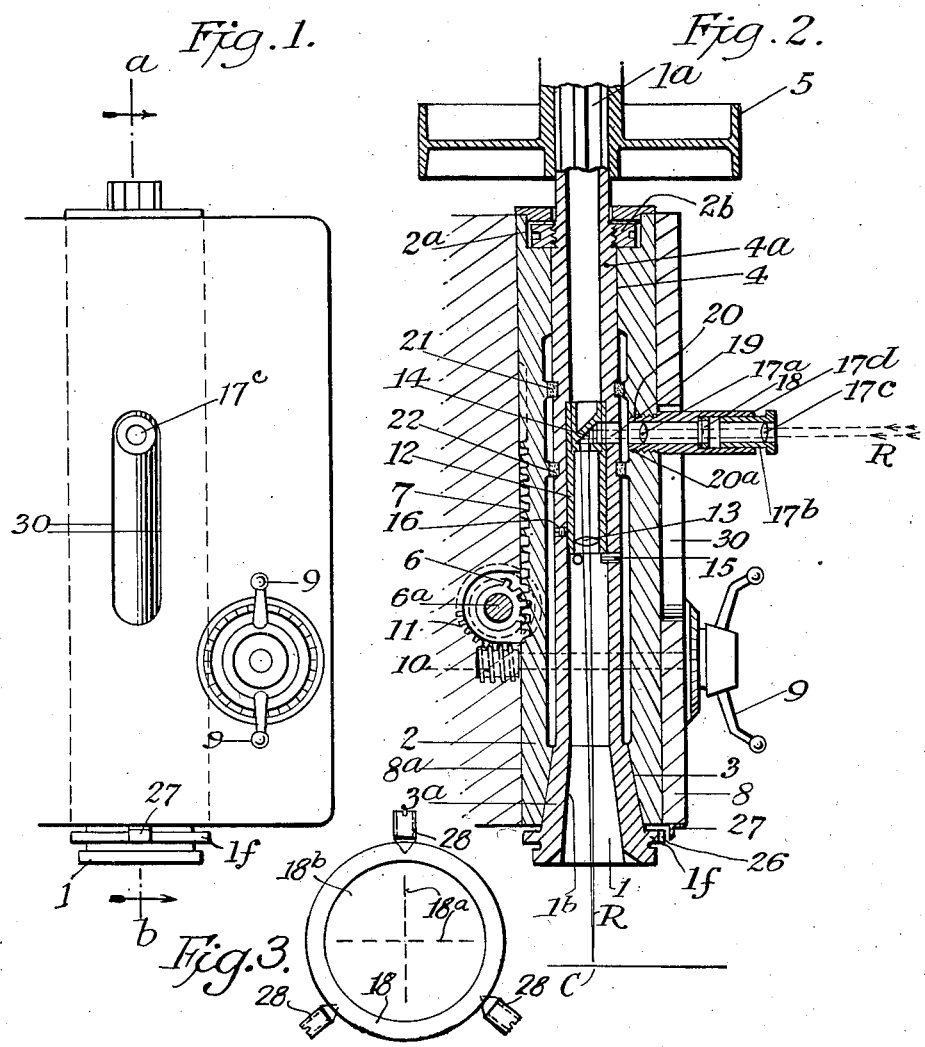
INVENTOR,
Georg Möller,
BY
Frank S. Appleman
ATTORNEY.

Patented May 28, 1940

2,202,222

UNITED STATES PATENT OFFICE 2,202,222

CENTERING MEANS FOR DRILLING MACHINE SPINDLES

Georg Möller, Berlin-Neukoelln, Germany, assignor to Herbert Lindner, Berlin-Wittenau, Germany Original application January 4, 1937, Serial No. 119,042. Divided and this application October 11, 1938, Serial No. 234,456. In Germany August 3, 1936

4 Claims. (Cl. 77—5)

This invention relates to centering means attached to a drill spindle to insure that its axis accurately intersects the work at a desired place say at the center of a hole to be drilled. More particularly, the invention relates to a device of this character especially adapted for use in coordinate drilling machines and wherein optical means are employed for sighting a point exactly in alinement with the axis of the drill spindle.

Heretofore attempts have been made to provide optical means for this purpose and in certain of the proposed devices an angled microscope was fitted to the lower end of the drill spindle, either by providing the microscopic instrument with a tapered attaching member or by providing some other means for securing the instrument to the lower end of the spindle. This was found objectionable because it necessitated application and removal of the microscope each time the drill was set and there was thus not only much delay entailed, but there was great danger of injury to the microscope, due to its being constantly handled.

Attempts were made to overcome this difficulty by mounting the microscope in the hollow spindle with the eye-piece at the top of the spindle. While this allowed the microscope to be made a fixed part of the drill, it introduced other difficulties because the top of the drill spindle in most coordinate drilling machines is much higher than the eye of a machinist standing at the drill and the microscope could only be used by climbing on the drill or on a ladder or box. Therefore, in such cases, it would be impossible for the machinist, to look in the eye-piece of the microscope and to manipulate simultaneously the means for effecting the adjustment of the worktable and the drilling head. Furthermore, it was found advisable, in many machines, to remove the eye-piece during the drilling operation, due to the structure and operation of the drive for the machine. In such cases, there still existed the danger of injury to the instrument.

One important object of the present invention is to provide a novel arrangement of microscope and drill spindle wherein the microscope is carried by the machine in permanent operative relation thereto.

A second important object of the invention is to provide a novel arrangement of microscope and drill spindle wherein the object glass is within the hollow drill spindle and the eye-piece extends laterally of the spindle, a sight opening being provided in the wall of the spindle and a reflector alined therewith.

A third important object of the invention is to provide a novel arrangement of this kind wherein the line of collimation of the microscope will coincide exactly with the axis of the spindle and wherein the adjustment of the object glass to and from the work will be effected by the usual operations of lowering and raising the spindle.

A fourth important object of the invention is to provide means whereby the sight opening in the spindle wall may be alined with the eye-piece end of the microscope, its movement to such position being indicated by suitable index means readily visible to the machinist.

A fifth important object of the invention is to provide a novel arrangement of this class wherein provision is made to prevent lubricant from the machine parts finding its way into the microscope.

A sixth object of the invention is to provide a device of this class wherein the eye-piece end of the microscope is attached to the feed sleeve of the spindle.

The subject matter of this application is divided from application Serial No. 119,042 of January 4, 1937.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 illustrates a front elevation of a portion of a drilling machine head embodying the invention;

Figure 2 illustrates a section on the line a—b of Fig. 1; and Fig. 3 illustrates an enlarged fragmentary detail disclosing the manner of adjusting the line of collimation of the microscope with respect to the axis of the drill spindle and its sleeve.

In the embodiment of the invention here disclosed, there is provided a tubular or hollow drill spindle 1 having the usual tapered socket 1b at its lower end, this socket being of standard taper to receive the correspondingly standardized taper tang of a drill. A portion of the drilling machine head is indicated at 8 and in this head is an accurate vertical bore 8a wherein is fitted a vertically slidable spindle sleeve 2 provided with a tapered lower bearing 3 and a cylindrical upper bearing 4. In these bearings fit corresponding journal portions 3a and 4a formed on the spindle 1. A socket 2a is formed at the upper end of the sleeve 2 and seated in this socket is a nut 2b which is screwed on the upper end of the spindle and serves to hold it in position for a close running fit of its journals in the bearings 3 and 4. These parts are carefully fitted to prevent any eccentricity of movement of the drill spindle, that is, to insure that the axis of the drill, when held in the socket 1b, will coincide with the axis of rotation of the spindle. On the upper end of the spindle is fitted a drive pulley 5 driven by suitable means (not shown), the spindle being held to slide vertically through the pulley, while revoluble therewith, by spline means 1a. The sleeve 2 is provided with a longitudinally extending rack 7 wherewith meshes a pinion 6 carried on a shaft 6a rotated by means presently described. By means of this rack and pinion the sleeve 2 is raised and lowered.

There is fixed on the shaft 6a a worm wheel 11 wherewith meshes a worm 10 rotated by an adjusting handle 9 mounted on the head 8. Mounted in the spindle 1 is an object glass tube 12 which carries at its lower end an object glass 13 while a reflecting device 14, such as a mirror or prism, is located at the upper end of the tube 12. This tube is held in proper position by suitable means such as the pins 15 and secured against rotation by a set-screw 16 screwed through the wall of the spindle 1 and engaging the side of the tube 12. In the spindle 1 is provided a sight opening 19 which is positioned so that light entering the tube 12 through the glass 13 will be reflected through the sight opening 19. In the sleeve 2 is also formed a sight opening 20 which is on a vertical level with the sight opening 19. In order to determine when the sight opening 19 is rotatably in registry with the sight opening 20, there is provided on the lower end of the spindle 1 a collar 1f which is provided with an index mark 26 which, when brought into registry with an index 27, indicates that the two sight openings are alined.

Packing rings 21 and 22 are arranged between the spindle and sleeve above and below the sight opening 19 in order to prevent lubricant used between the spindle and sleeve from finding its way into the microscope.

As shown in Figs. 1 and 2, there is provided a microscope tube 17d which is screwed into the opening 20a of the sleeve 2. This tube is provided with an erecting lens 17a, sliding eye-piece tube 17b, eye-piece lens 17c and cross-hair ring 18. The housing 8 for the sleeve 2 is provided with a vertical slot 30 wherethrough the tube 17d projects. The tube 17d may thus slide vertically with the sleeve as the latter is adjusted.

With this arrangement, it will be seen that the light rays R pass through the microscope from the center point C and by proper adjustment of the sleeve 2 and eye-piece 17b the center point C may be brought sharply into focus in the field of vision of the microscope. Then by manipulating the table feeds of the machine, this point C may be brought into registry with the intersection of the lines 18 and thus to lie in the line of collimation of the microscope and axis of rotation of the spindle and drill tool.

There have thus been provided simple and efficient means of the kind described and for the purposes specified.

The details of the hair ring 18 are illustrated in Fig. 3 and the ring 18 carries a transparent plate 18b having a pair of hair-lines 18a inserted thereon. This ring may be adjusted to bring the intersection of the lines 18a into the line of collimation of the microscope by means of three set-screws 28 passing through the tube 17d and engaging the ring at 120° intervals.

It is obvious that changes may be made in the form and construction of the invention without departing from the principles involved. It is not therefore desired to confine the invention to the exact form shown and described, but it is desired to include all forms which come within the scope of the appended claims.

I claim:

1. In combination with a drilling machine having a head carrying a vertically movable spindle sleeve and having a drill spindle rotatably mounted in said sleeve, said sleeve and drill spindle having alinable sight openings and cooperating means being provided on the head and spindle for indicating alinement of said openings, a tube fixed in the hollow spindle and having an opening registering with the sight opening in the spindle, an object glass at the lower end of said tube, a reflector above said glass and opposite the tube opening, said head having a vertical slot therein, an eye-piece extending transversely of said slot and alined with the sight opening in the sleeve, and means for connecting the eye-piece and sleeve to cause the two to move together.

2. In combination with a drilling machine having a head carrying a vertically movable spindle sleeve and having a drill spindle rotatably mounted in said sleeve, said sleeve and drill spindle having alinable sight openings and cooperating means being provided on the head and spindle for indicating alinement of said openings, a tube fixed in the hollow spindle and having an opening registering with the sight opening in the spindle, an object glass at the lower end of said tube, a reflector above said glass and opposite the tube opening, said head having a vertical slot therein, an eye-piece extending transversely of said slot and alined with the sight opening in the sleeve, and a screw thread connection between the eye-piece and said sight opening in the sleeve.

3. In combination with a drilling machine having a head carrying a vertically movable spindle sleeve and having a drill spindle rotatably mounted in said sleeve, said sleeve and drill spindle having alinable sight openings and cooperating means being provided on the head and spindle for indicating alinement of said openings, a tube fixed in the hollow spindle and having an opening registering with the sight opening in the spindle, an object glass at the lower end of said tube, a reflector above said glass and opposite the tube opening, said head having a vertical slot therein, an eye-piece extending transversely of said slot and alined with the sight opening in the sleeve, means for connecting the eye-piece and sleeve to cause the two to move together, and packing means above and below the sight opening between the drill spindle and sleeve.

4. In combination with a drilling machine having a head carrying a vertically movable spindle sleeve and having a drill spindle rotatably mounted in said sleeve, said sleeve and drill spindle having alinable sight openings and co-operating means being provided on the head and spindle for indicating alinement of said openings, a tube fixed in the hollow spindle and having an opening registering with the sight opening in the spindle, an object glass at the lower end of said tube, a reflector above said glass and opposite the tube opening, said head having a vertical slot therein, an eye-piece extending transversely of said slot and alined with the sight opening in the sleeve, a screw thread connection between the eye-piece and said sight opening in the sleeve, and packing means above and below the sight opening between the drill spindle and sleeve.

GEORG MÖLLER.